Patented July 3, 1923.

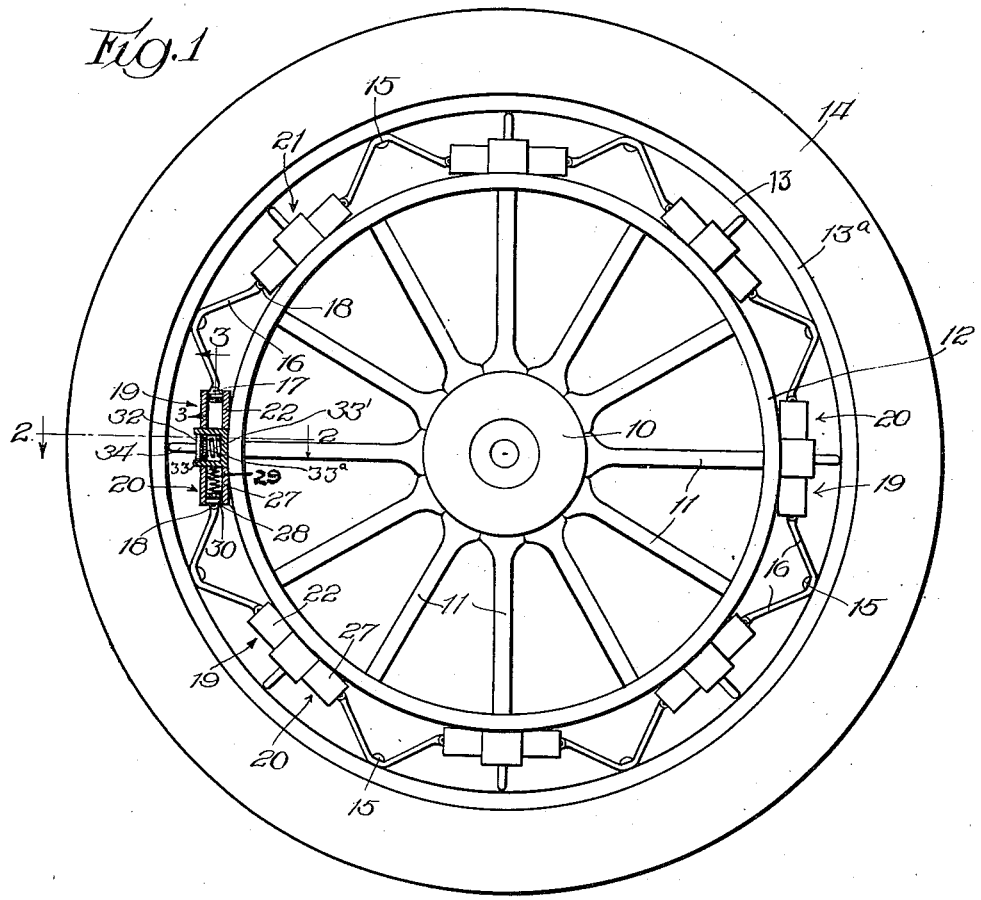

1,460,453

UNITED STATES PATENT OFFICE.

MYER J. STEIN, OF CHICAGO, ILLINOIS.

CUSHION WHEEL.

Application filed May 19, 1920. Serial No. 382,632.

*To all whom it may concern:*

Be it known that I, MYER J. STEIN, a citizen of the United States, residing at Chicago, in the county of Cook and State of Illinois, have invented new and useful Improvements in Cushion Wheels, of which the following is a full, clear, concise, and exact description, reference being had to the accompanying drawing, forming a part of this specification.

My invention relates to cushion wheels and more particularly to a pneumatic spring cushion wheel.

One of the objects of this invention resides in the production of a wheel in which the shock and vibration absorbing means is composed of an improved form and combination of pneumatic and spring means which combination will act to readily absorb vibrations and shocks as efficiently as such shocks and vibrations are absorbed by the wellknown pneumatic tire and without the attending difficulties experienced with the use of pneumatic tires, such as punctures, blow outs, etc.

Another object of the invention consists in the production of an improved form of cushion wheel which is simple in construction and in which resilient vibration and shock absorbing means of improved form comprising a combination of pneumatic and spring means are assembled with a tire tread in such a manner as to efficiently absorb shocks, jars and vibrations to which the tire tread is subjected.

A further object resides in the production of a cushion wheel in which an improved form of pneumatic means is utilized to absorb vibrations and shocks to which the tread of a vehicle wheel is ordinarily exposed and subjected.

Other objects of the invention will become apparent from the following description, the accompanying illustrations and the appended claim.

In the drawings in which one embodiment of my invention is shown—

Fig. 1 is a side elevation of a wheel showing one of the cushioning elements in section;

Fig. 2 is a sectional view taken on line 2—2 of Fig. 1; and

Fig. 3 is a detail sectional view of one of the pneumatic cushioning members taken on line 3—3 of Fig. 1.

The preferred form of cushion wheel, as shown in the drawings, comprises a hub 10, upon which is radially mounted a plurality of spokes 11, upon the outer end of which spokes is arranged an inner circular rim 12. An outer rim 13, which is larger in diameter than the inner rim 12, has flanges 13$^a$ formed thereon, between which flanges is disposed any suitable tread such as the solid rubber tire 14.

Secured to the inner surface of the outer rim 13, preferably by means of bolts such as 15, are the leaf springs 16, which springs have pivotally secured at one end 17 the pneumatic cushioning member 19, and at the other end 18 the spring cushioning member 20. These members 19 and 20 are circumferentially arranged around the outer surface of the inner rim 12. Secured on the inner rim between each set of pneumatic cushion and spring cushion members 19 and 20 are radially extending pneumatic cushion members 21 which will be hereinafter more specifically described.

The pneumatic cushion means 19 comprises a cylinder 22 in which is reciprocally mounted the plunger 23 which has a gasket 24 secured thereto by means of a bolt and nut 25. The outer face of said plunger carries a lug 26 to which one end of the spring 16 is pivotally connected, as shown at 17, in Fig. 3.

The spring cushioning means 20 comprises a cylinder 27 in which is reciprocally mounted a plunger 28, which plunger engages a spring 29 within said cylinder. The plunger 28 carries a lug 30 to which the other end of the spring 16 is pivotally connected, as shown at 18 in Fig. 1.

The radially disposed pneumatic cushioning means 21 comprises a cup member 31 which is suitably secured on the rim 12. The sides of said cup are positioned between the inner ends of each set of cylinders 22 and 27 of the pneumatic and spring cushioning means respectively, said cup serving to close up the inner ends of the cylinders to form an abutment for the spring 29 of the spring cushioning means on one side and to form the end wall for the compressed air cylinder 22 of the pneumatic cushioning means on the other side.

A plunger 32 is disposed within the cup member 31 which plunger carries a gasket 33 secured to the plunger by means of a bolt and nut such as 33$^a$. Secured to the plunger 32 is a plunger rod 34 which is in contact with a point of the inner surface of the outer rim 13 because of the action of the compressed air in the cup member 31. Obviously if desired, a compression spring such as 33' shown in Figs. 1 and 2 could be used in addition to the pneumatic means to take up the jars and vibrations.

When traveling over the road vehicles having steel tread or solid rubber tire wheels are subjected to considerable shocks and jars. Means have been provided in this construction whereby this objectionable feature is entirely overcome and any shocks or jars to which the wheels are subjected will be completely absorbed within the wheel before these shocks reach the axles of the vehicle and at the same time these wheels will have the easy riding effect of a pneumatic tire without the inconveniences due to punctures and blow-outs.

Shocks and jars are absorbed by this improved form of construction before they reach the axle of the car in the following manner: When the tread of the wheel is subjected to an initial shock or vibration, this shock will be transmitted initially to the leaf spring 16 and the pneumatic cushioning means 21, both of which will absorb a certain amount of this initial shock or vibration. The shock and vibration transmitted to the leaf spring 16 which is not absorbed by this leaf spring, will be transmitted and absorbed by the pneumatic cushioning means 19 and by the spring cushioning means 20. Thus shock or vibration which cannot be entirely absorbed by the leaf spring 16 and the pneumatic cushioning means 21 will be transmitted to the pneumatic cushioning means 19 connected to one end of each of the leaf spring 16 and to the spring cushioning means 20 connected to the other end of each leaf spring as hereinbefore described.

The pneumatic cushioning means 19 and 21 in absorbing the shock or vibration will offer greater resistance to said shock or vibration as their plungers 23 and 32 move in the chambers 22 and 31 respectively and the air cushion in the chamber is compressed. Consequently, this pneumatic cushioning means will serve to increase its resistance to shock and vibrations as it is gradually moved from its normal position, as shown in Fig. 1. The spring cushioning means connected to the opposite end of each leaf spring 16 will function in the same manner since the spiral spring 29 will offer greater resistance to the plunger 28 as said spring is compressed within the cylinder 27.

In the construction shown in the drawings, the plunger 28 is snugly fitted within the chamber 27 and the inner wall of said chamber is preferably graphited or oiled so as to give a smooth action for the plunger 28 and whereby an air cushioning effect is obtained with the construction shown in the spring cushioning means 20 when the plunger 28 is rapidly moved to compress the spring 29.

It will therefore be evident that when the tread 14 of the wheel is subjected to shocks or vibrations, these shocks and vibrations will be initially transmitted to the plunger rods 34 and their associated pneumatic cushioning means, and the leaf spring 16. Excessive shocks will be transmitted from the leaf spring 16 to the circumferentially arranged pneumatic and spring cushioning means 19 and 20 respectively.

The radially arranged pneumatic means 21, the leaf spring 16, and the pneumatic and spring cushioning means 19 and 20 respectively, as illustrated in the drawings, are all so combined, associated, interconnected and arranged that the combined effect of these inter-related parts will serve to equally distribute throughout the entire wheel any shocks and jars to which the tread 14 of the wheel is subjected. This combination, therefore, results in a uniform distribution of such shocks, jars and vibrations and acts to prevent breakage of the wheel and unnecessary strains at certain points of the wheel subjected to the initial jar or shock. The combination of shock, jar and vibration absorbing means 16, 19, 20 and 21 therefore serve to receive the shock and to distribute it circumferentially about the wheel in the spring and pneumatic vibration absorbing means hereinbefore described.

The invention obviously is not limited to the specific embodiment thereof herein illustrated and described, but is capable of many variations and other applications within the spirit and scope of the invention as set out in the following claim.

Having thus described my invention, what I claim as new and desire to secure by Letters Patent is:

A cushion wheel comprising an inner and outer rim, a plurality of cylinders circumferentially arranged between said rims, alternately arranged pneumatic and spring cushioning means in said cylinders, spring cushioning members disposed between and closing the inner ends of said cylinders, springs secured to said outer rim, one end of each of said springs being connected to one of said pneumatic cushioning means and the other end being connected to one of said spring cushioning means to effect the cushioning of said pneumatic and spring cushioning means within said cylinders.

In witness whereof, I have hereunto subscribed my name.

MYER J. STEIN.